Aug. 19, 1952        C. B. ROSE        2,607,212
SPEEDOMETER TESTING MACHINE
Filed Feb. 4, 1948        3 Sheets-Sheet 1
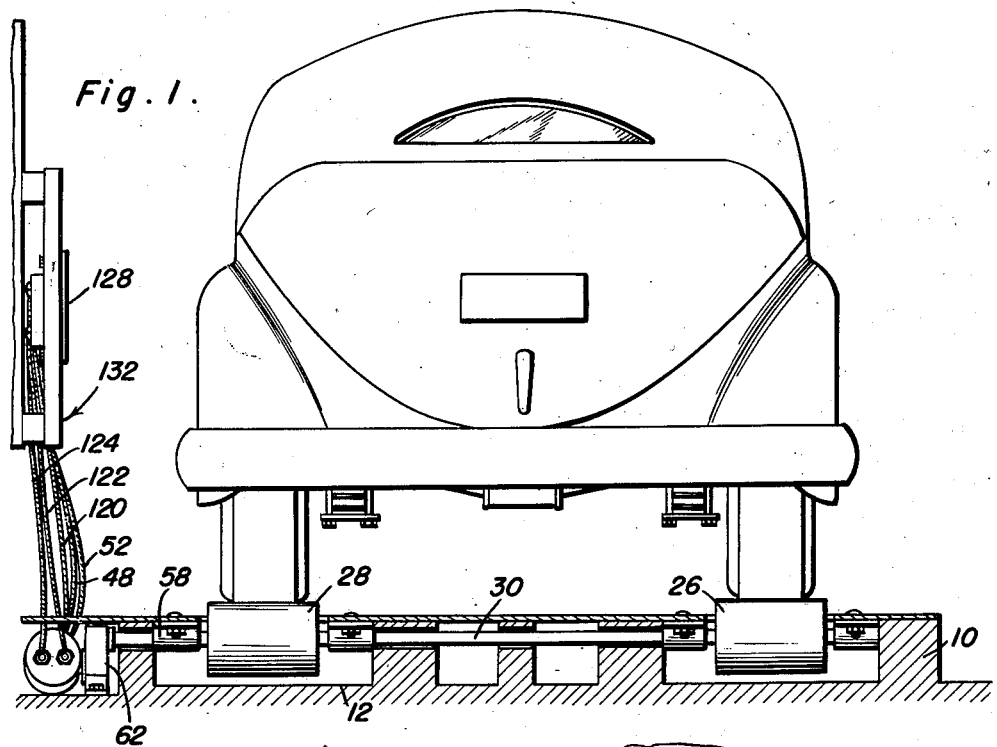
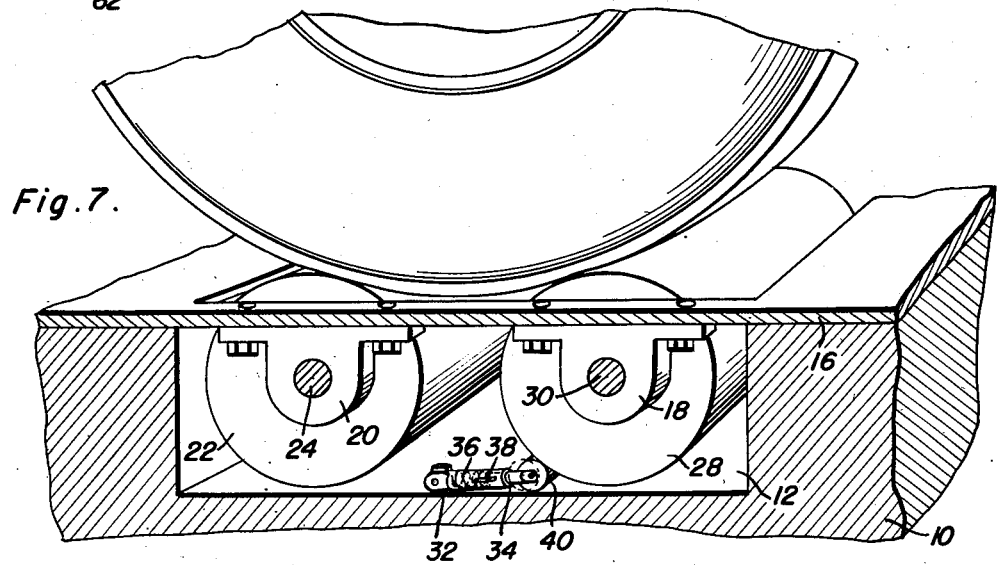
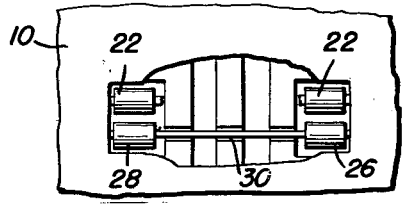
Charles B. Rose
INVENTOR.
BY *James A. O'Brien*
*and Harvey B. Jackson*
Attorneys

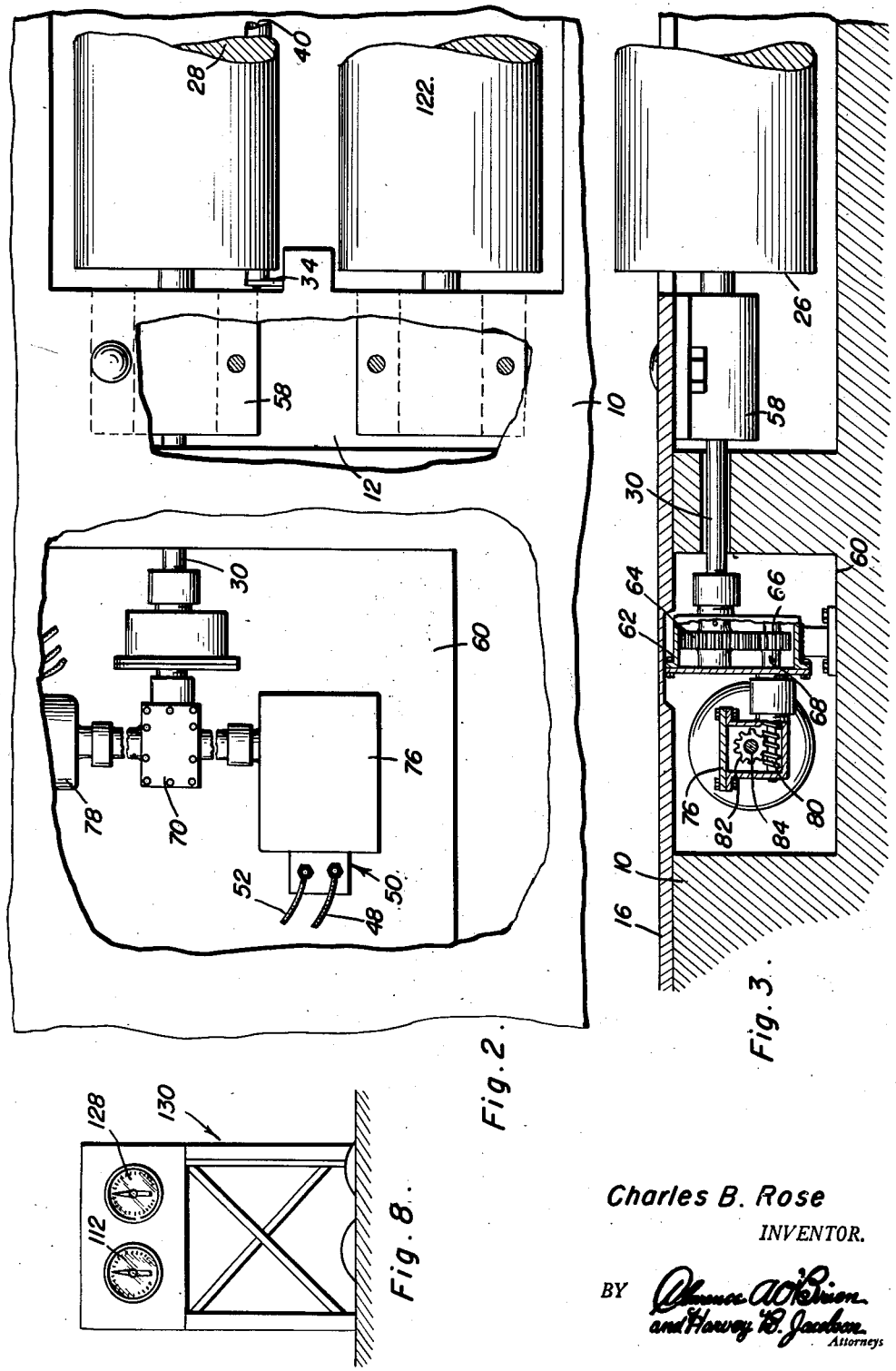

Aug. 19, 1952     C. B. ROSE     2,607,212
SPEEDOMETER TESTING MACHINE
Filed Feb. 4, 1948     3 Sheets-Sheet 3
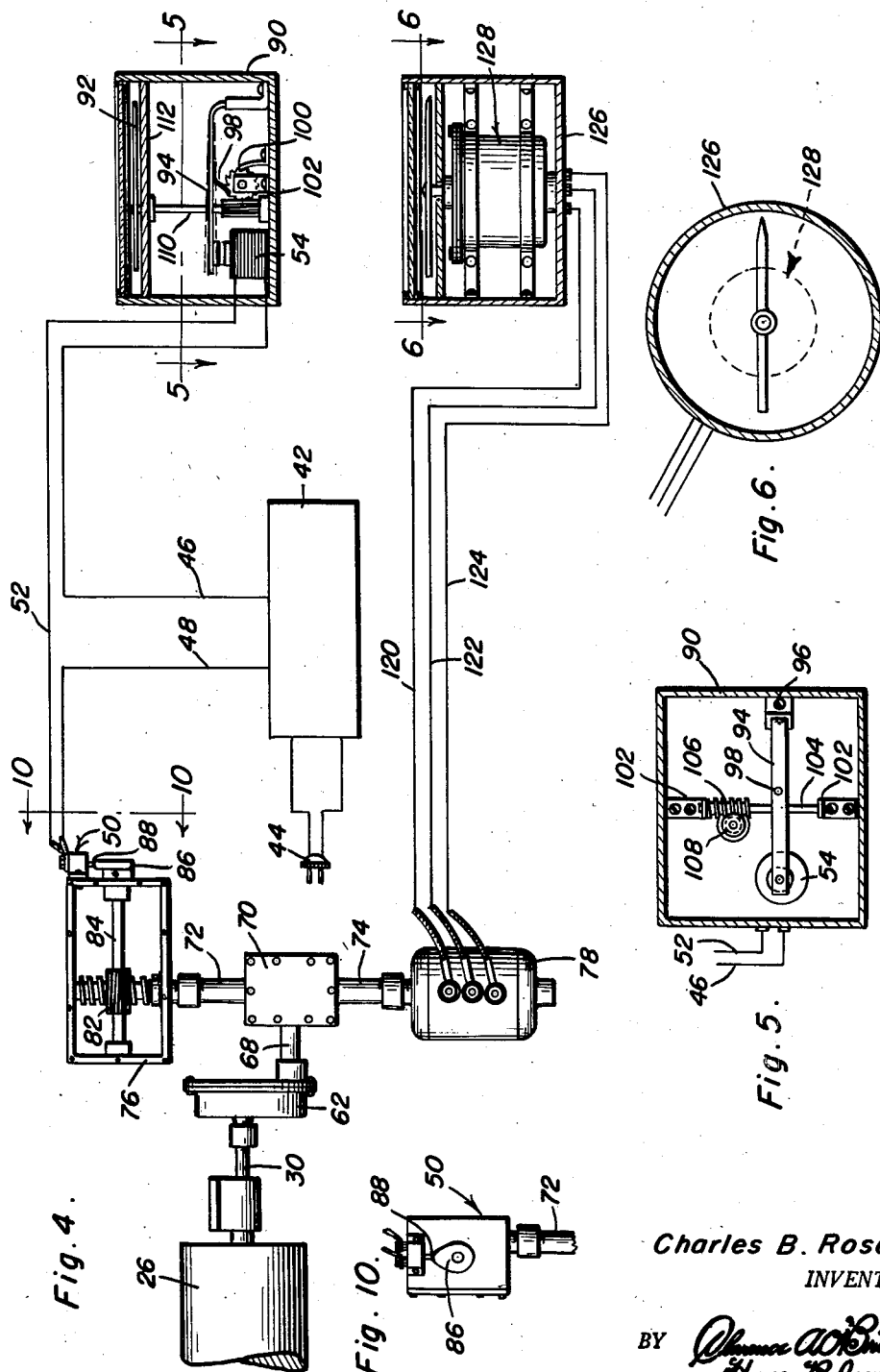
Charles B. Rose
INVENTOR.
BY
*Attorneys*

Patented Aug. 19, 1952

2,607,212

UNITED STATES PATENT OFFICE 2,607,212

SPEEDOMETER TESTING MACHINE

Charles B. Rose, Atlanta, Ga.; Lucy V. Rose executrix of said Charles B. Rose, deceased Application February 4, 1948, Serial No. 6,137

1 Claim. (Cl. 73—2)

This invention appertains to novel and useful improvements in a test device for use in association with automotive vehicle mileage and speed indicators.

An object of this invention is to test accurately automobile and truck speedometers and tachometers and their driving connections to determine their accuracy under the conditions in which they normally operate.

Another object of this invention is to electrically actuate a master speed indicator by means of current generated by the movement of the driver wheels of a vehicle.

Another object of this invention is to test the mileage indicator in a vehicle through electrical means, the current being intermittently supplied to an electrically operative master mileage indicator through the medium of a switch which is actuated by means of the rotation of the driver wheels of a vehicle.

Another object of this invention is to supply a simplified device utilizing numerous conventional elements for accurately and normally testing certain indicators of conventional vehicles.

A further object of this invention is to prevent rotation of a driven roller in a single direction, whereby the vehicle may normally and easily be moved from the roller under its own power.

Ancillary objects and features of novelty will become apparent to those skilled in the art, in following the description of the preferred form of the invention, illustrated in the accompanying drawings, wherein:

Figure 1 is an elevational end view of the preferred form of the invention showing the same in use;

Figure 2 is an enlarged fragmentary plan view of details of construction;

Figure 3 is a sectional view of a gear reduction mechanism and worm and gear drive utilized in association with the invention;

Figure 4 is schematic wiring diagram illustrating operative elements in section to clearly disclose details of construction;

Figure 5 is a sectional view taken substantially on the line 5—5 of Figure 4 and in the direction of the arrows;

Figure 6 is a sectional view taken substantially on the line 6—6 of Figure 4 and in the direction of the arrows;

Figure 7 is a perspective view illustrating particularly the arrangement of rollers and the locking means for impeding the travel of selected rollers in one direction;

Figure 8 is an elevational view of the apparatus showing the same in association with a suitable support;

Figure 9 is a plan view illustrating the arrangement of driven rollers and idlers; and Figure 10 is a sectional view taken substantially on the line 10—10 of Figure 4 and in the direction of the arrows, illustrating the cam actuated switch forming a portion of the invention.

In carrying out the functions of the inventive concept, certain structure required is illustrated herewith and will be described at this time.

A suitable stand or support which might be concrete as disclosed in Figure 7 and indicated at 10, is provided with recesses or wells 12. A suitable cover plate 16 may be supplied in association with the wells and bearings 18 and 20 respectively secured thereto. Suitable idler rollers 22 may be secured to conventional shafts 24 and positioned within the wells. A pair of rollers 26 and 28 respectively are secured to a common shaft 30 which extends across the well 12. This of course drivingly connects the opposed rollers 26 and 28.

In operation of this portion of the invention, the rear wheels of a conventional vehicle are placed on the rollers 22, 26 and 28 and the engine of the vehicle is rendered operative.

Of course, the rear wheels of the vehicle are also operated by the engine thereby rotating the said rollers.

The specific construction of the rollers may be either smooth and composed of a resilient material, or if desired, small grooves may be supplied therein for the purpose of supplying additional traction.

When it is desired to remove the vehicle from the support 10, as when a test is completed, all that is necessary is to operate the vehicle in a backward direction. In this operation, means for preventing rotation of the connected rollers 26 and 28 is rendered operative. The preferable means may be seen as an arm 32 pivotally mounted in the well 12 adjacent the roller 28. This arm has a bore wherein there is extensibly positioned a rod 34. The said rod is resiliently biased by means of a spring 36 which seats in the bore of the arm 32 and engages the rod 34. In order to prevent undesired movement of the rod 34 relative to the arm 32, a small pin may be secured to the rod and extend through a suitable slot 38 formed in the arm 32. This construction of course, limits the travel of the rod 34 relative to the arm 32. A lock roller 40 is supplied adjacent one terminal portion of the rod 34 and is engageable with the roller 28. Of course, when the roller 28 is actuated in a reverse direction (reverse relative to the movement of the vehicle) the lock roller 40 will be clamped beneath the peripheral surface of the roller 28 and on the seat or bottom portion of the well 12.

A major electrical circuit is supplied in association with and forming a part of the invention, which major circuit includes two minor circuits. Referring to Figure 4 the first minor circuit may be seen as including current conversion means and illustrated as the copper oxide rectifier 42. A suitable alternating current outlet may be tapped by means of the plug 44 for supplying the rectifier with alternating current. The output is of course, direct current which extends or travels therefrom through the medium of the conductor 46.

A second conductor 48 also extends from the rectifier and terminates in a conventional circuit breaker generally indicated at 50. A line or conductor 52 extends from another pole of the conventional switch 50 and terminates in an electromagnet 54 which is seated in a master mileage indicator.

It may now be seen that upon actuation of the switch 50 direct current from the rectifier may be intermittently supplied to the electromagnet 54 through the medium of conductors 52 and 46.

Drivingly connected with the roller 26 is the aforementioned shaft 30 and the said shaft may be additionally supported by means of a conventional bearing 58. A mechanism for transferring the torque of the shaft 30 in various directions and at various speeds is supplied. As is seen in Figure 3 it may be supplied in a well 60 in the support 10. The preferable construction of the transmission means includes a gear casing 62 having a gear 64 journalled therein, which gear is connected with the shaft 30. A pinion 66 is in mesh with the gear 64 and has a shaft 68 rigidly secured thereto.

As is seen in Figures 3 and 4 the said shaft 68 extends to a gear box 70 including gears having opposed shafts attached thereto. These opposed shafts are housed in suitable sleeves 72 and 74 respectively, which sleeves terminate in a suitable housing 76 and a generator 78.

The housing 76 contains a mileage transmitter which is composed of a worm gear 80 suitably journalled in the housing and a pinion 82 enmeshed therewith. A shaft 84 is operatively connected with the pinion 82 and extends through the housing 76 at one end thereof. A cam 86 may be attached to the free end of the shaft 84 which extends through the housing 76 and this cam engages a plunger 88 for intermittently actuating this switch 50. By this construction it is now apparent that upon rotation of the roller means 26 and 28, the switch 50 will be intermittently actuated in order to supply pulsations of current to the electromagnet 54 in accordance with the speed of the rollers.

The said electromagnet is of course positioned in the casing 90 wherein there is supplied a mechanism for moving a hand 92 in accordance with the intermittent pulsations caused by the switch 50.

A resilient contact arm 94 is attached to the housing 90 by a suitable means such as the rivet 96 and extends over a core of the electromagnetic means. The resilient arm 94 is constantly biased upward due to its inherent characteristics and the electromagnet checks the same upon energization as the arm 94 is actuated in this manner, a finger 98 which is attached thereto engages the progressive teeth on a cog wheel 100. The said cog wheel is supported to a suitable bracket 102 which is also seated on the base of the housing 90. Upon rotation of the cog wheel 100, the shaft 104 is rotated, as is the worm 106 which is rigidly attached thereto. This worm 106 is enmeshed with a pinion 108, the pinion being attached to a shaft 110. The hand 92, aforementioned is attached also to this shaft 110 and a suitable indicia bearing plate 112 is positioned thereunder. Intermittent pulsations from the rectifier cause the hand 92 to be moved in stages in accordance with the rotation of the rollers 26 and 28 and consequently the rotation of the driving wheels of a vehicle.

Referring now to the second minor circuit, it is readily apparent that three leads 120, 122 and 124 respectively extend from the generator 78. These leads terminate in suitable terminals extending through a housing 126. The said housing 126 has a speed indicator or tachometer 128 of conventional character positioned therein. Of course, two of the leads 120 and 122 are positive while the other lead 124 may be a ground connection.

From the above described second minor circuit in the main circuit, it may be readily appreciated that upon rotation of the rollers 26 and 28 respectively as urged by the driving wheels of a vehicle, the actual speed of the wheels may be indicated on the master speed indicator within the housing 126. The master mileage indicator and master speed indicator may be positioned in a suitable support or stand 130, illustrated in Figure 8. Of course, if it is found desirable the legs of the stand 130 may be omitted thus producing a stand or support as indicated at 132 in Figure 1. This stand may be secured to a suitable wall or the like wherein it might be viewed from the operator's seat of the vehicle being tested so that the mileage and speed indicators of the vehicle might be correlated with the master indicators.

The operation of the invention has been setforth accompanying the structure description. It is understood of course that variations may be made however, without departing from the spirit of the invention. Accordingly, limitation is sought only in accordance with the scope of the following claim.

Having described the invention, what is claimed as new is:

For use with a vehicle indicator test apparatus having a support with a roller adapted to be driven by a vehicle wheel, means for preventing rotation of said roller in only a single direction, said means comprising an arm pivoted to said support, a spring disposed in contacting relationship with said arm, a rod extensibly connected with said arm and having said spring bearing thereagainst constantly urging said rod outwardly of said arm, a stop connected to said arm and said rod for limiting the extent of extensible movement of said rod with respect to said arm, a locking roller connected to said rod and arranged to be contacted by said first mentioned roller, and said locking roller being located between a part of said support and said first mentioned roller so as to bind therebetween when the first mentioned roller is rotated in one direction.

CHARLES B. ROSE.

REFERENCES CITED

The following references are of record in the file of this patent:

UNITED STATES PATENTS

| Number | Name | Date |
| --- | --- | --- |
| 282,452 | Glover | July 31, 1883 |
| 489,480 | Jacot | Jan. 10, 1893 |
| 1,473,580 | Hauptmann | Nov. 6, 1923 |
| 1,871,053 | Haeberle et al. | Aug. 9, 1932 |
| 2,188,570 | Farr et al. | Jan. 30, 1940 |
| 2,301,115 | Gilbert | Nov. 3, 1942 |

FOREIGN PATENTS

| Number | Country | Date |
| --- | --- | --- |
| 485,929 | Great Britain | May 24, 1938 |